(12) United States Patent  (10) Patent No.: US 6,644,255 B1
Henry  (45) Date of Patent: Nov. 11, 2003

(54) GUIDE PLATE FOR A POPPET VALVE

(75) Inventor: Carl Carisbrook Henry, Noranda, WA (US)

(73) Assignee: Vee Two Ptd Ltd., Malaga (AU)

(*) Notice: Subject to any disclaimer, the term of this patent is extended or adjusted under 35 U.S.C. 154(b) by 0 days.

(21) Appl. No.: 10/110,623

(22) PCT Filed: Oct. 16, 2000

(86) PCT No.: PCT/AU00/01253

§ 371 (c)(1),
(2), (4) Date: Jun. 6, 2002

(87) PCT Pub. No.: WO01/29466

PCT Pub. Date: Apr. 26, 2001

(30) Foreign Application Priority Data

Oct. 15, 1999 (AU) .............................. PQ 3456
Oct. 18, 1999 (AU) .............................. PQ 3492

(51) Int. Cl.[7] ................................................. F01L 1/34
(52) U.S. Cl. ................................. 123/90.16; 123/90.24; 123/198 F
(58) Field of Search ................. 123/90.16, 90.24–90.26, 123/90.28–90.29, 47 AA, 198 F; 251/251, 238

(56) References Cited

U.S. PATENT DOCUMENTS 4,191,214 A    3/1980  Holley et al. ............ 137/630.2
4,898,130 A *  2/1990  Parsons ................... 123/90.16
5,168,896 A * 12/1992  Boesch et al. .............. 137/553

FOREIGN PATENT DOCUMENTS

WO    WO 98/36157    8/1998    ............. F01L/1/12
WO    WO 99/63257   12/1999    ........... F16K/31/04

* cited by examiner

Primary Examiner—Thomas Denion
Assistant Examiner—Kyle Riddle
(74) Attorney, Agent, or Firm—Baker & Daniels

(57) ABSTRACT

A guide member for a valve actuation mechanism, the guide member having a slot or profiled surface defining a valve actuating portion and a non-valve actuating portion. A valve actuating member such as a pin, moves along the slot or profiled surface in a cyclic fashion, wherein the pin is connected to a valve so that when the pin moves along the valve actuating portion, the valve is actuated, and when the pin moves along the non-valve actuating portion, the valve is not actuated. The non-valve actuating portion of the slot or profiled surface is of sufficient length such that the entire range of cyclic motion of the pin is able to be contained within the non-valve actuating portion. To move the range of cyclic motion from one section of the guide path to another, the guide member may be moved relative to the pin. Said arrangement allows a valve to be selectively operated or deactivated without changing the cyclic motion of the pin, but by merely moving the guide member.

28 Claims, 6 Drawing Sheets

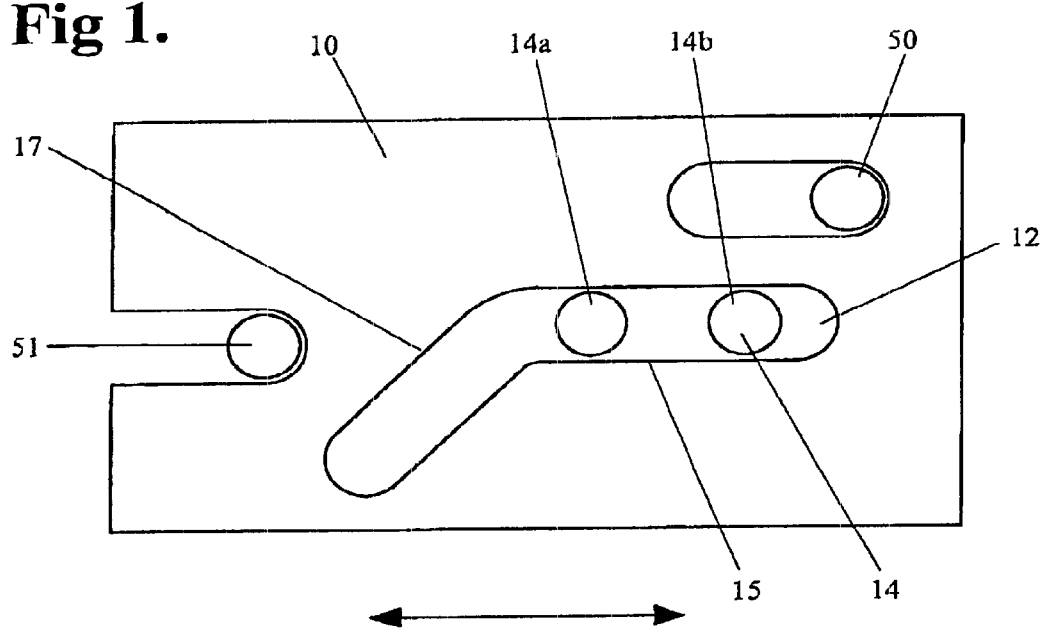
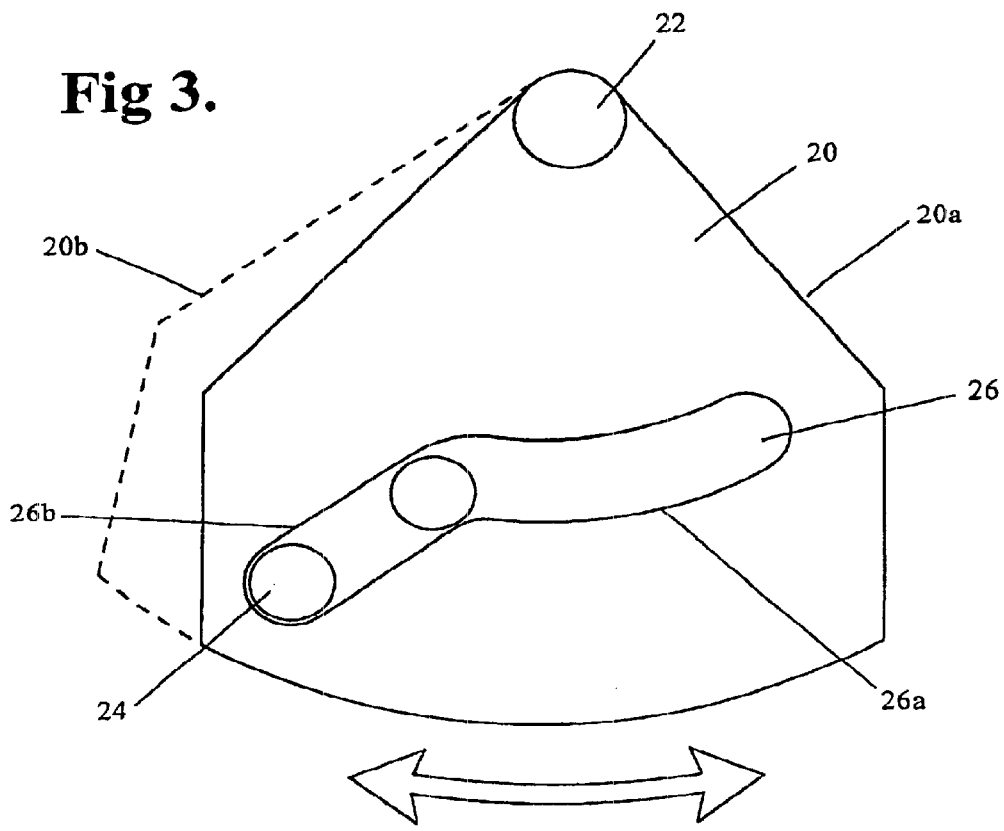

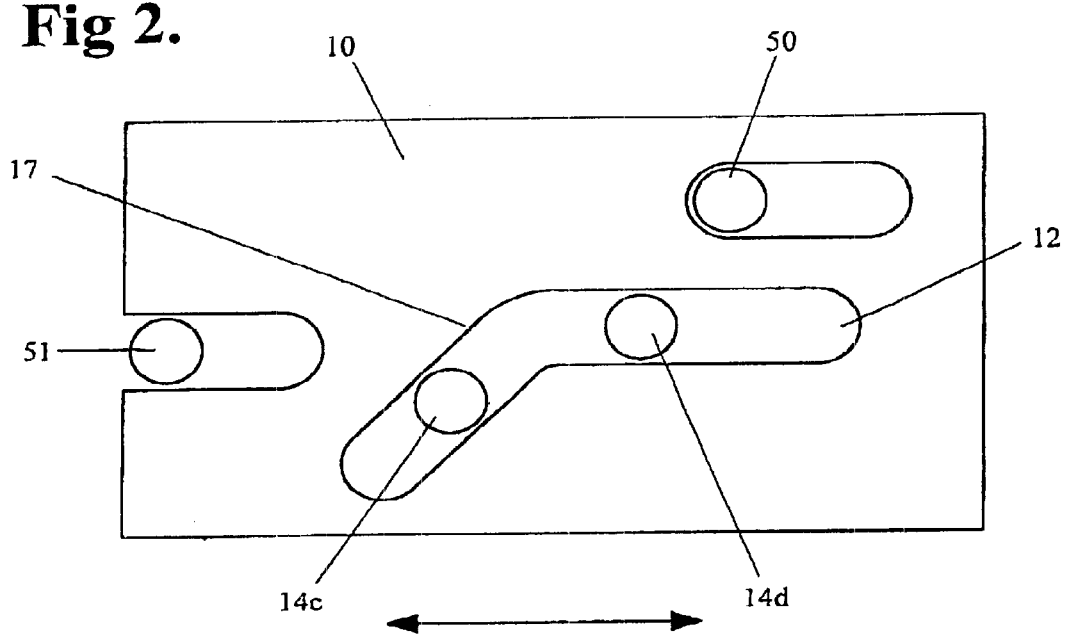
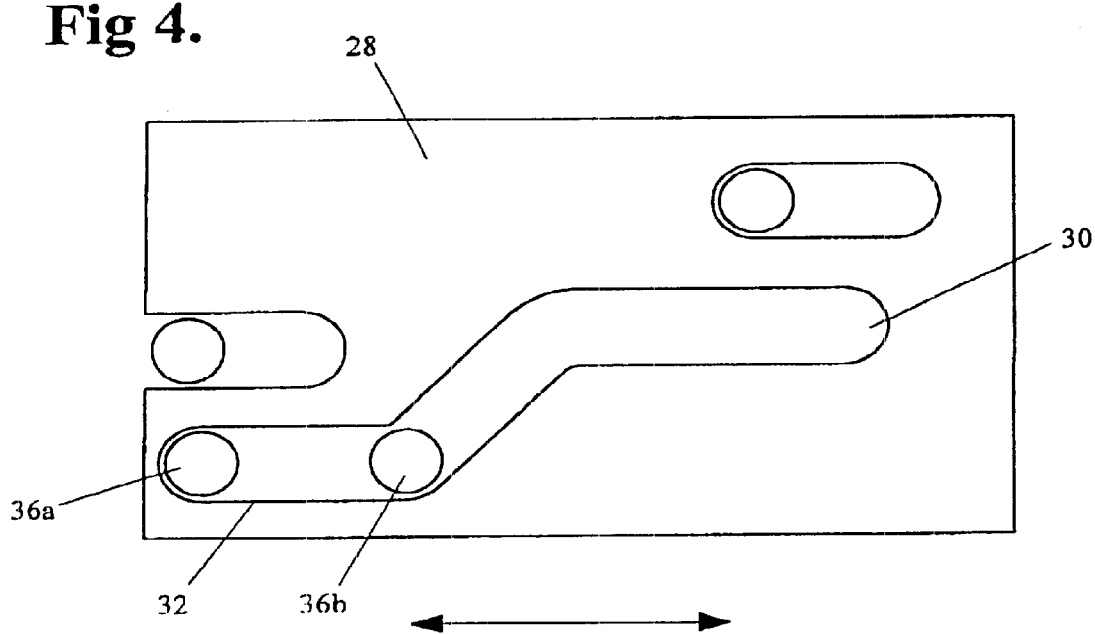

GUIDE PLATE FOR A POPPET VALVE

The present invention relates to a guide plate for actuating a poppet valve.

Guide plates can be used to vary the motion characteristics of poppet valves that are used in internal combustion engines or pumps. The guide plate, which typically incorporates a guide path, can be moved such that a valve actuating means achieves different motion characteristics depending on the position of the guide plate. This is useful, as the valve actuation means then opens and closes the valve with different valve timing and/or valve movement depending on variables such as the speed of the piston.

It is a requirement of spark ignition engines to be throttled by controlled restriction of the air flow to the cylinders. In a predominance of engines a single butterfly valve, located at a distance from the inlet valves, is employed to reduce air flow by restricting air flow along the inlet tract, thus the lowering of the inlet tract pressure.

It is generally accepted that superior engine efficiency at part loads would result when full inlet tract pressure is maintained at all times. This situation is possible and optimal when throttling is achieved by a controlled variation of inlet valve opening.

It has also been demonstrated that in the case of multi-cylinder engines, the necessity for part load operation of individual cylinders can be minimized by the shutting down of a selected number of cylinders.

The present invention seeks to solve the problems associated with the prior art by providing a guide plate having a guide path for a valve actuation means, wherein part of the guide path is adapted to restrict the valve actuation means from moving the valve from an open position to a closed position, or from a closed position to an open position.

This provides the advantage that the mechanism for varying the valve timing and/or valve movement can also cause the valves to be held in a substantially shut position, or a substantially open position, for a full cycle of the piston. This allows the cylinder to be kept shut or open, thus preventing the cylinder from working and can also be used to regulate the speed of the engine.

In one embodiment, the present invention includes a guide plate having a guide path such that when the valve actuation member moves along a first portion of the guide path, the valve actuation means does not move the valve from a closed position to an open position, or from an open position to a closed position, and when the valve actuation member moves along a second portion of the guide path, the valve actuation means moves the valve from a closed position to an open position, or from an open position to a closed position.

In another form the present invention relates to a guide plate having a guide path including a valve actuating portion and a non-valve actuating portion, a valve actuating member which moves along the guide path, wherein the valve actuating member may move solely along the non-valve actuating portion such that the valve is not actuated.

In a further embodiment, the guide plate is moved to change the portion of the guide path along which the valve actuation member travels. In this way, the valve actuation member can move in a constant manner with respect to the cylinder position, but the valve lift can be varied by the movement of the guide plate. The guide plate can be moved to such a position that there is either no valve lift during a full cycle of movement of the piston within the cylinder, or to such a position that the valve lift is never zero, i.e., the valve does not close for a whole cycle of the piston movement within the cylinder.

The present invention also relates to a method of selectively activating or deactivating a valve for a mechanism having a guide plate with a guide path, and a valve actuation member moving along the guide path, including the steps of:

having a guide plate with a non-valve actuating portion and a valve actuating portion;

selectively positioning the guide plate in a position such that the valve actuation member moves along the guide path only along the non-valve actuation portion of the guide path so that the valve is not activated; and positioning the guide plate such that the valve actuation member moves along at least a portion of the valve actuating portion to activate the valve.

One or more of the preferred embodiments will now be described with reference to the accompanying drawings, wherein:

FIG. 1 shows a schematic representation of a guide plate of the present invention in a first position showing a first range of movement of a valve actuation member;

FIG. 2 shows the schematic representation of the guide plate of FIG. 1 in a second position showing a second range of movement of the valve actuation member as it follows the guide path;

FIG. 3 shows a schematic representation of a second embodiment of the guide plate and guide path;

FIG. 4 shows a schematic representation of a third embodiment of the guide plate and guide path.

Figure 5:
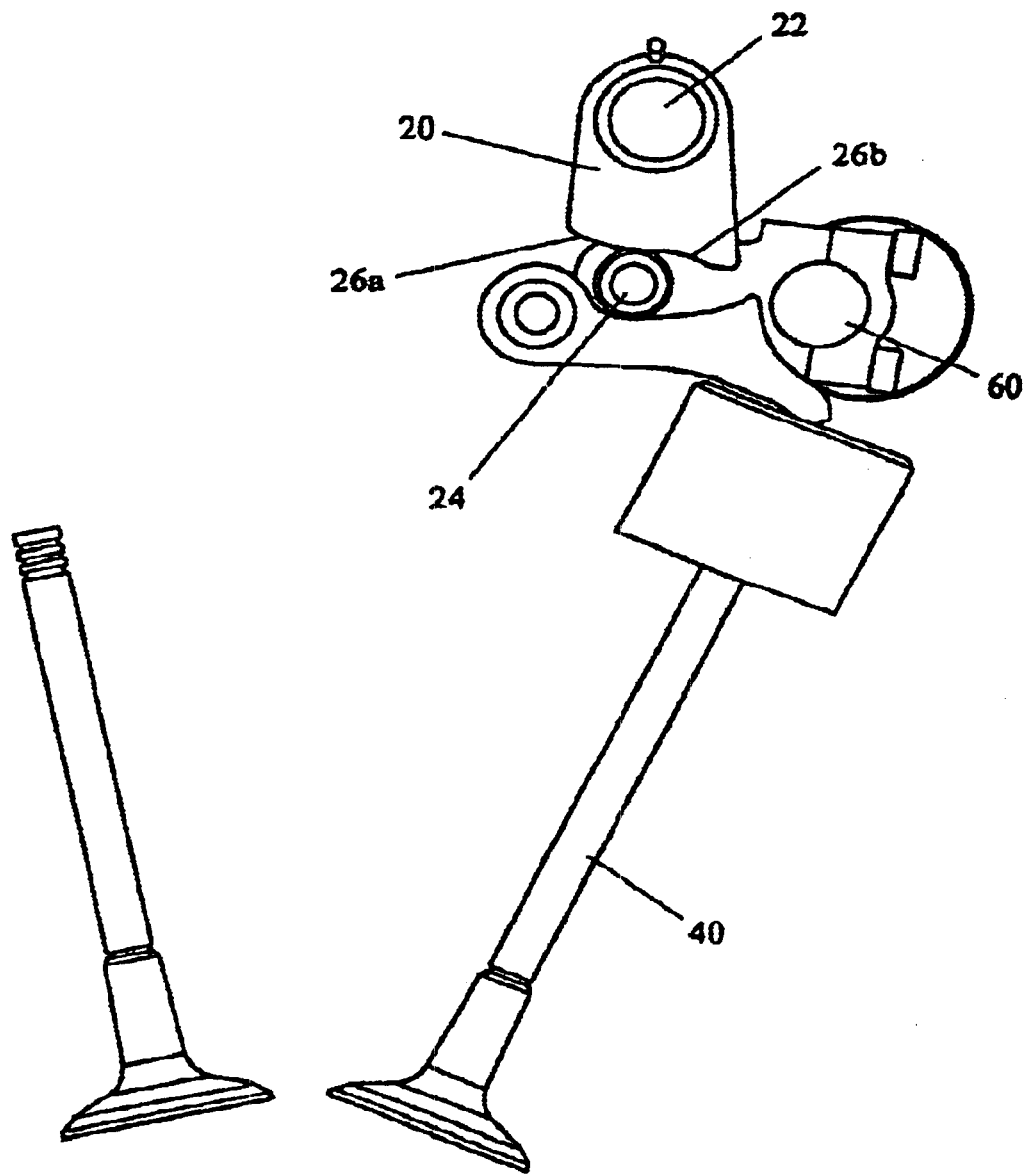
FIG. 5 shows a representation of a fourth embodiment of the guide plate of the present invention.

In FIG. 1 there is shown guide plate 10 having a guide path 12, and a valve actuation member 14 travelling within. More detail of the valve actuation member and other guide path embodiments is provided in International Patent application PCT/AU98/00090, the contents of which are hereby incorporated by reference. In one embodiment, a vale actuation means includes a crankshaft and connecting rod adapted to impart reciprocal movement to a valve actuation member that includes a pin. When the guide path is moved from a first position, as shown in FIG. 1, to a second position as shown in FIG. 2 the path taken by the valve actuation member varies. When the guide path is in the first position, the valve actuation member travels along the non-valve actuating portion 15, begin in this case, the straight portion of the guide path, as shown by the positions 14*a* and 14*b*, which represent typical end positions of the movement of the valve actuation member during a cycle of reciprocal movement. This results in the valve actuation member not actuating the valve (not shown), but leaving the valve closed.

As the guide path is moved from the first position to the second position, the valve actuation member travels further along the valve actuating portion 17 of the guide path, and thus the valve actuation member causes valve lift to increase. The duration of valve opening is also increased.

As can be seen from FIG. 2, the guide path has moved so that the valve actuation member now has some of its travel occurring along the valve actuating portion 17 of the guide path. The extent of the movement of the valve is shown by positions 14c and 14d and also in the relative positions of guide pins 50 and 51 relative to the guide plate 10. This allows the valves to be opened and closed.

By having the valve closed, it is possible to prevent the cylinder from filling with or emptying the working fluid, and thus in a multi-cylinder pump or engine, more load will be placed on the other cylinders that are working. This provides the advantage that the other cylinders are kept working at a capacity that is closer to optimal.

It is also possible to keep the valves open during a whole cycle of the pump or engine, by positioning the guide plate in a third position, such that the valve actuation member moves along a portion of the guide path that causes the valve to be lifted off of the seat. This is shown in the embodiment shown in FIG. 4 where it can be seen that there is a guide plate 28 having a second straight portion 32 of the guide path 30. This second straight portion allows the valves to be held open for a full cycle of valve actuation member movement, the extent of which is shown typically as being between positions 36a and 36b. This causes the valves to be held open, which may be of benefit in certain applications. Thus, by moving the guide plate 28 it is possible to vary the valve movement via the valve actuation member from keeping the valve fully closed, opening and closing, and fully open, during the cycle of the engine, pump or compressor.

As can be seen in FIG. 4, the guide path has an extended end region 32 that allows the valve actuation member to always be in a position such that the valves are kept open. This allows a free flow of air in and out of the cylinder, which may be desired in certain circumstances.

In FIG. 3, a schematic of a pivotally mounted guide plate 20 is shown. Position 20a shows a position of the guide plate when rotated to vary the motion characteristics of the valve. When it is desired to keep the valve closed during an engine cycle, the guide plate 20 is in a position as shown in broken outline 20b wherein the valve actuation member has its entire travel range within the non-valve actuating portion 26a of the guide path 26. The valve actuating portion 26b of the guide path 26 is not concentric on pivot point 22, and by rotating the guide plate to the position shown by 20a, the valve actuation member will travel at least partially into valve actuating portion 26b, thus actuating the valve.

In FIGS. 5, 6, 7 and 8 a pivotally mounted guide plate 20 is shown. As this embodiment is similar to the embodiment shown in FIG. 3 (although shown in mirror image), like reference numerals have been employed. The guide plate 20 is located on a pivot point 22, thus allowing the guide plate 20 to alter its position so that the valve actuation member 24 can travel either on the non-valve actuating portion 26a of the guide path 26 when it is desired to keep the valve 40 shut, for example between the end positions 24a (FIG. 7) and 24b (FIG. 8), or along the valve actuating portion 26b of the guide path, when it is desired to keep the valve 40 open. In between these extremes, the movement of the guide plate causes the valve actuation member to vary its trajectory, thus changing the motion characteristics of the valve.

As shown in FIGS. 5 to 8, the valve actuation member 24 is driven by valve crankshaft 60. Valve crankshaft 60 preferably rotates at a fixed proportion of engine crankshaft speed. The range of motion of the valve actuation member is determined by the stroke of the crankshaft. In the present invention, it has been discovered that the non-valve actuating portion of the guide path should be at least as long as the stroke of the crankshaft, in order to ensure that the travel of the valve actuation member will be able to be wholly contained within the non-valve actuation portion of the guide path for at least one position of the guide plate.

Figure 6:
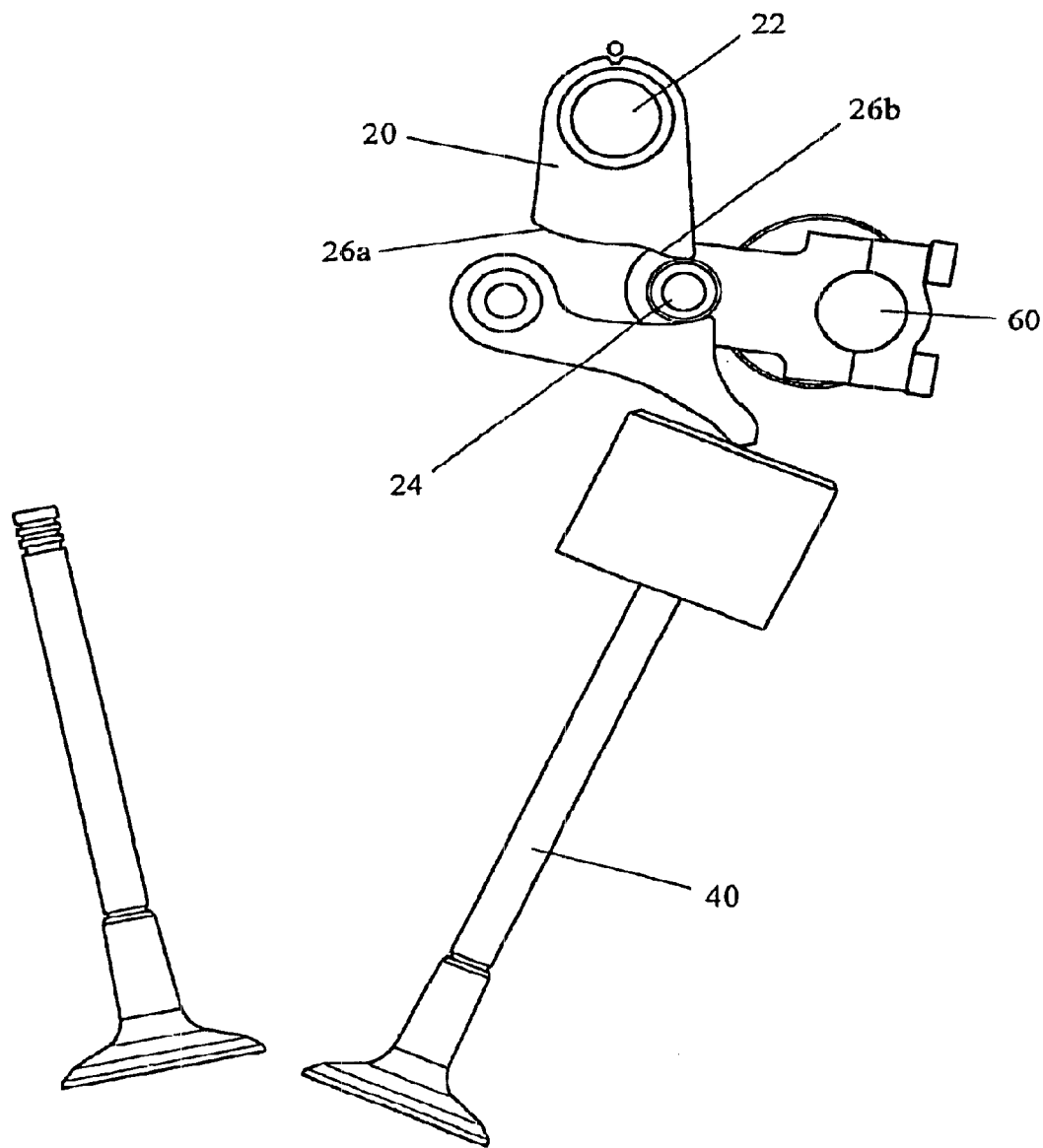
FIG. 6 shows the fourth embodiment with the valve actuation member relocated to achieve a maximum lift state of the valve.
Figure 7:
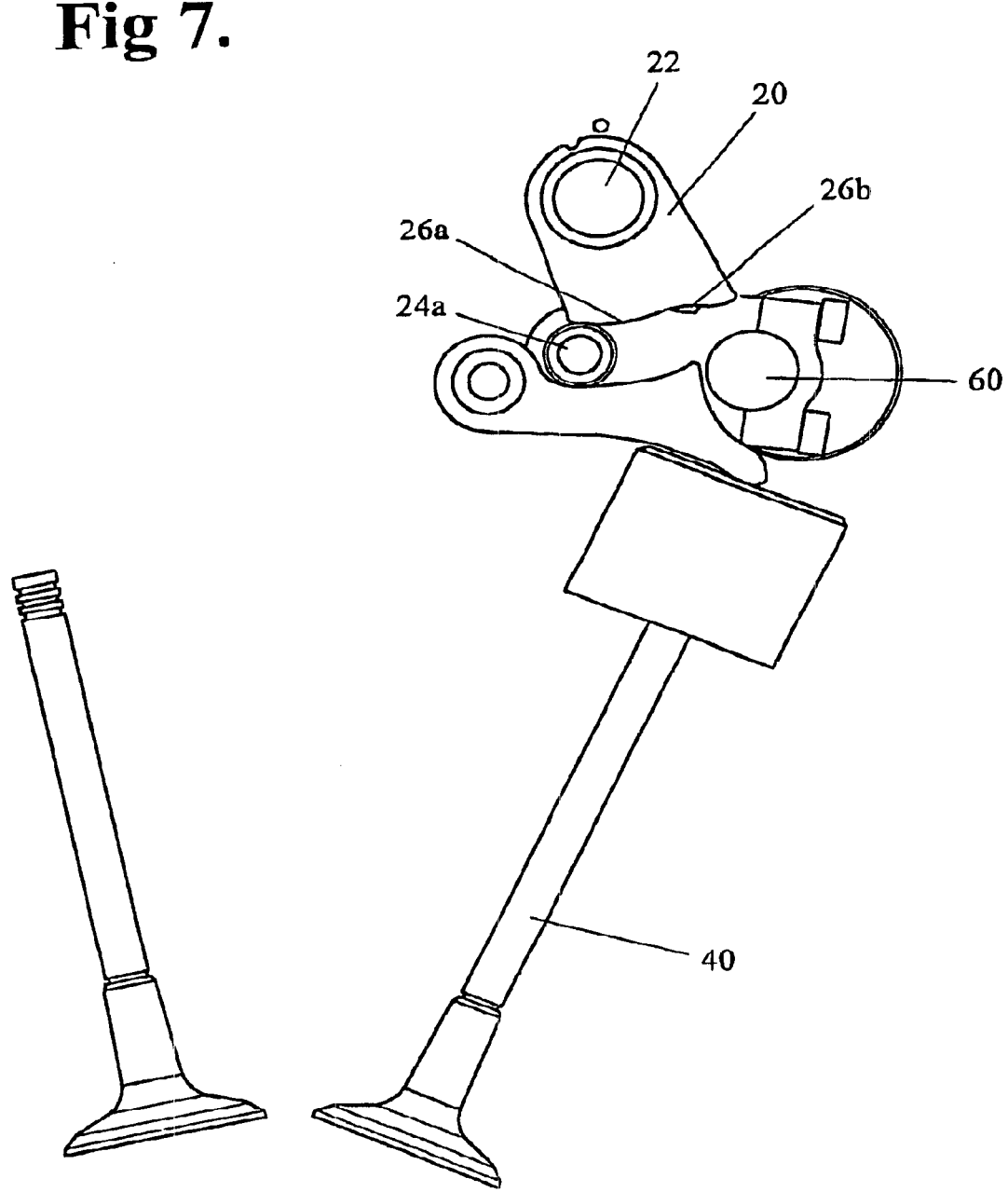
FIG. 7 shows the fourth embodiment with the guide plate in a second position and the valve actuation member located to achieve a dwell state of the valve.
Figure 8:
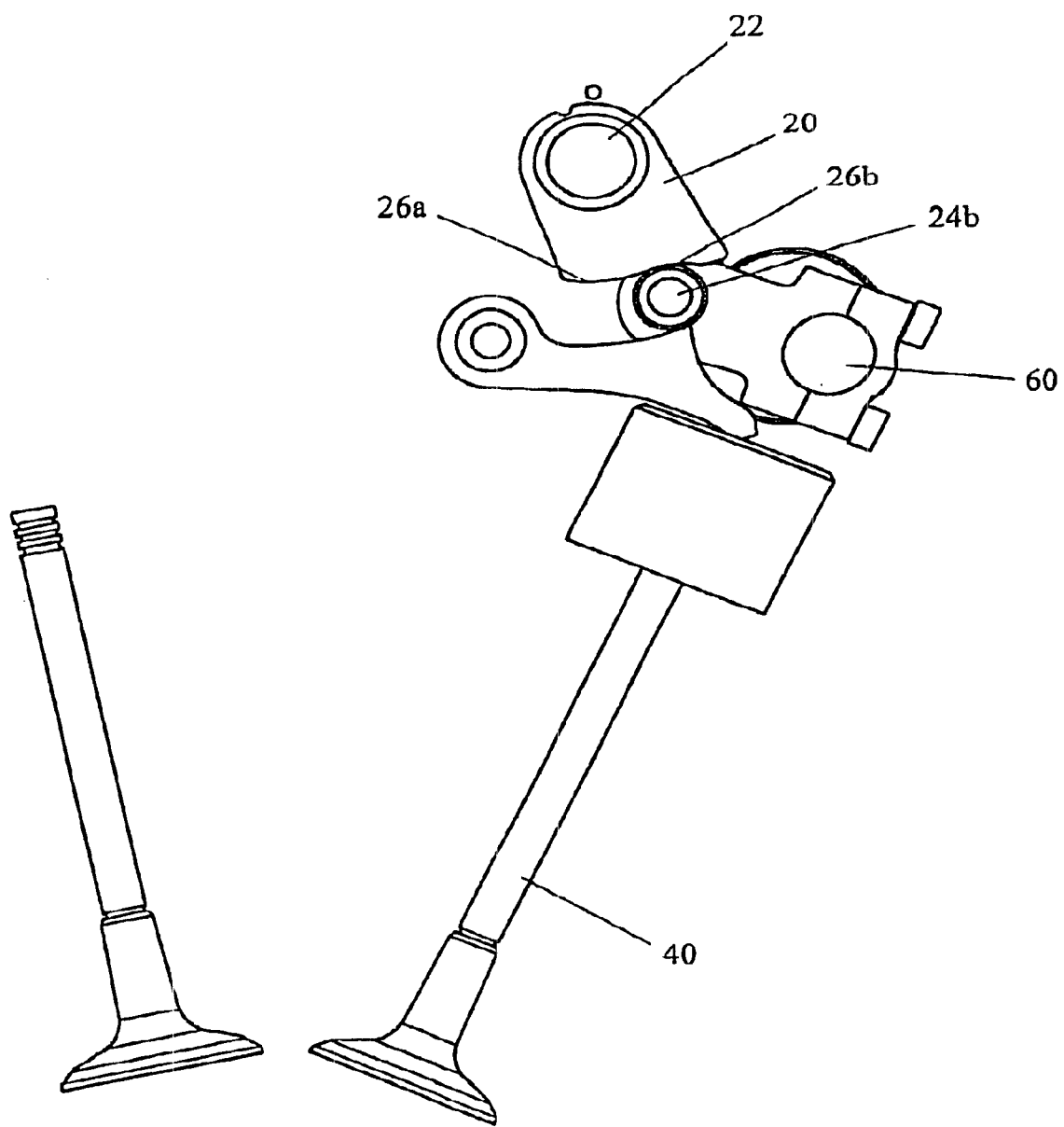
FIG. 8 shows the fourth embodiment with the valve actuation member relocated but retaining the dwell state of the valve.

It can be seen that the guide plate 20 in FIGS. 5 and 6 has rotated to be in a different position in FIGS. 7 and 8. The guide plate, when in a position as shown in FIGS. 5 and 6, causes the valve actuation member 24 to move in both the valve actuating portion 26b and the non-valve actuating portion 26a. Thus when the guide path is in the position shown in FIGS. 5 and 6, the valve can be opened and closed in accordance with desired timing relating to piston position. In FIGS. 7 and 8, however, the guide plate 20 has moved into a position such that the valve actuation member only moves along the non-valve actuating portion 26a, and therefore the valve is not actuated during an engine cycle (being a rotation of the engine crankshaft). The guide plate can move to be in a position anywhere between the two positions shown in FIGS. 5 and 6, and 7 and 8.

It should also be noted that an additional advantage of the present invention is that the guide plate having a guide path to vary valve motion characteristics, can act as a throttle mechanism. By varying the position of the guide path, the valve lift can be varied, resulting in less working fluid entering the system. As the valves control the flow of air, there is no requirement for a separate or second throttling mechanism. The present invention may also be used in conjunction with a means for reducing or stopping the flow of fuel into individual cylinders. An example of such an arrangement in an internal combustion engine is where the engine management system cuts off the supply of fuel to certain cylinders, as well as closing off or keeping open the valves. This system may be of particular use with direct fuel injection, as the flow of fuel and air could then be controlled without the need for a separate throttling mechanism in the inlet manifold.

The present invention may be particularly useful when used with engines, pumps and compressors that need to be throttled or operated at part load, however many applications where poppet valves are used are envisaged.

The guide plate having a guide path can be moved by any known method, and may be moved either in a linear direction, for example in slots, or rotatably around a fixed point.

It should be noted that the present invention could include a wide variety of guide path shapes and arrangements, for example, including but not limited to the guide plates and guide paths shown in PCT/AU98/00090.

What is claimed is:

1. A valve actuating apparatus including a guide member and a valve actuation member wherein said guide member includes a guide path having a valve actuating portion and one or more non-valve actuating portions and wherein, in use, said valve actuation member selectively moves solely along one of the non-valve actuating portions of the guide path such that the valve is not actuated.

2. The valve actuating apparatus of claim 1 wherein the non-valve actuating portion is of sufficient length such that movement of the valve actuation member over an entire cycle of the engine occurs solely along the non-valve actuating portion of the guide path.

3. The valve actuating apparatus of claim 1 wherein the valve actuation member is moveable solely along the valve actuating portion or the non-valve actuating portion of the guide path.

4. The valve actuating apparatus of claim 1 wherein the valve actuation member is moveable along a portion of both the valve actuating portion and the non-valve actuating portion of the guide path.

5. The valve actuating apparatus of claim 1 wherein the portion of the guide path along which the valve actuation member moves is adjustable by selective positioning of said guide member.

6. The valve actuating apparatus of claim 5 wherein said guide member is moveable between a first position and a second position, wherein when said guide member is in said first position the valve actuation member has its entire travel range within the non-valve actuating portion of the guide path, and wherein when said guide member is in said second position the valve actuation member has its entire travel range within the valve actuating portion of the guide path.

7. The valve actuating apparatus of claim 6 wherein the guide member is moveable to a position anywhere between the first and second positions such that the valve actuation member is moveable along a portion of both the valve actuating portion and the non-valve actuating portion of the guide path.

8. The valve actuating apparatus of claim 6 wherein the guide member is moveable between the first and second positions by rotational movement of the guide member.

9. The valve actuating apparatus of claim 6 wherein the guide member is moveable between the first and second positions by linear movement of the guide member.

10. The valve actuating apparatus of claim 8 wherein the guide member is located relative to a pivot point.

11. The valve actuating apparatus of claim 9 wherein the guide member is located relative to one or more guide pins.

12. The valve actuating apparatus of claim 1 wherein the valve actuation member is driven by a crankshaft to move cyclically along said guide path.

13. The valve actuating apparatus of claim 12 wherein the non-valve actuating portion of the guide path is at least as long as the stroke of the crankshaft.

14. A means for controlling the speed of an internal combustion engine having a combustion chamber and at least one valve, by controlling the motion characteristics of said valve using the apparatus of claim 4.

15. A method of selectively activating and deactivating a valve using a valve actuating apparatus including a guide member having a guide path with a non-valve actuating portion and a valve actuating portion, including the steps of:

selectively positioning the guide member such that motion of the valve actuation member with respect to the guide member is limited to the non-valve actuating portion of the guide path such that the valve is not activated; and selectively further positioning the guide member such that motion of the valve actuation member with respect to the guide member is not limited to the non-valve actuating portion of the guide path such that the valve is activated.

16. A valve actuating apparatus for controlling the speed of an internal combustion engine having a combustion chamber and at least one valve associated with said combustion chamber, said apparatus including a guide path, having a valve actuating portion and a non-valve actuating portion, and a valve actuation member for actuating the valve, wherein, in use, the valve actuation member selectively moves along a portion of both the valve actuating portion and the non-valve actuating portion of the guide path to restrict movement of the valve and thereby control the speed of the engine.

17. The valve actuating apparatus of claim 16 wherein the portion of the guide path along which the valve actuation member moves is adjustable by selective positioning of said guide path.

18. The valve actuating apparatus of claim 16 wherein the valve actuation member is driven by a crankshaft to move cyclically along said guide path.

19. The valve actuating apparatus of claim 18 wherein the non-valve actuating portion of the guide path is at least as long as the stroke of the crankshaft.

20. A valve actuating apparatus for deactivating a combustion chamber of an internal combustion engine having at least one combustion chamber and at least one valve associated with said combustion chamber, said apparatus including a guide path, having a valve actuating portion and one or more non-valve actuating portions, and a valve actuation member for actuating the valve, wherein, in use, the valve actuation member selectively moves solely along one of the non-valve actuating portions of the guide path such that the valve is either held closed or is held open, thereby deactivating said combustion chamber.

21. The valve actuating apparatus of claim 20 wherein the portion of the guide path along which the valve actuation member moves is adjustable by selective positioning of said guide path.

22. The valve actuating apparatus of claim 20 wherein the valve actuation member is driven by a crankshaft to move cyclically along said guide path.

23. The valve actuating apparatus of claim 22 wherein the non-valve actuating portions of the guide path are at least as long as the stroke of the crankshaft.

24. A variable valve actuation apparatus including a variable means and a valve actuation member wherein the variable means is selectively positionable such that, in use, the valve actuation member moves along a non-valve actuating portion of a guide path, such that the valve is not actuated during an engine cycle.

25. The apparatus of claim 24 wherein the variable means is selectively positionable to adjust the amount of movement of the valve.

26. A means for controlling the speed of an internal combustion engine having a combustion chamber and at least one valve, by controlling the motion characteristics of said valve using the apparatus of claim 25.

27. The apparatus of claim 24 wherein the variable means is selectively positionable such that the valve is either held in a closed or an open position.

28. The apparatus of claim 24 wherein the non-valve actuating portion of the guide path is of sufficient length such that movement of the valve actuation member over an entire cycle of the engine occurs solely along the non-valve actuating portion of the guide path.

* * * * *